UNITED STATES PATENT OFFICE.

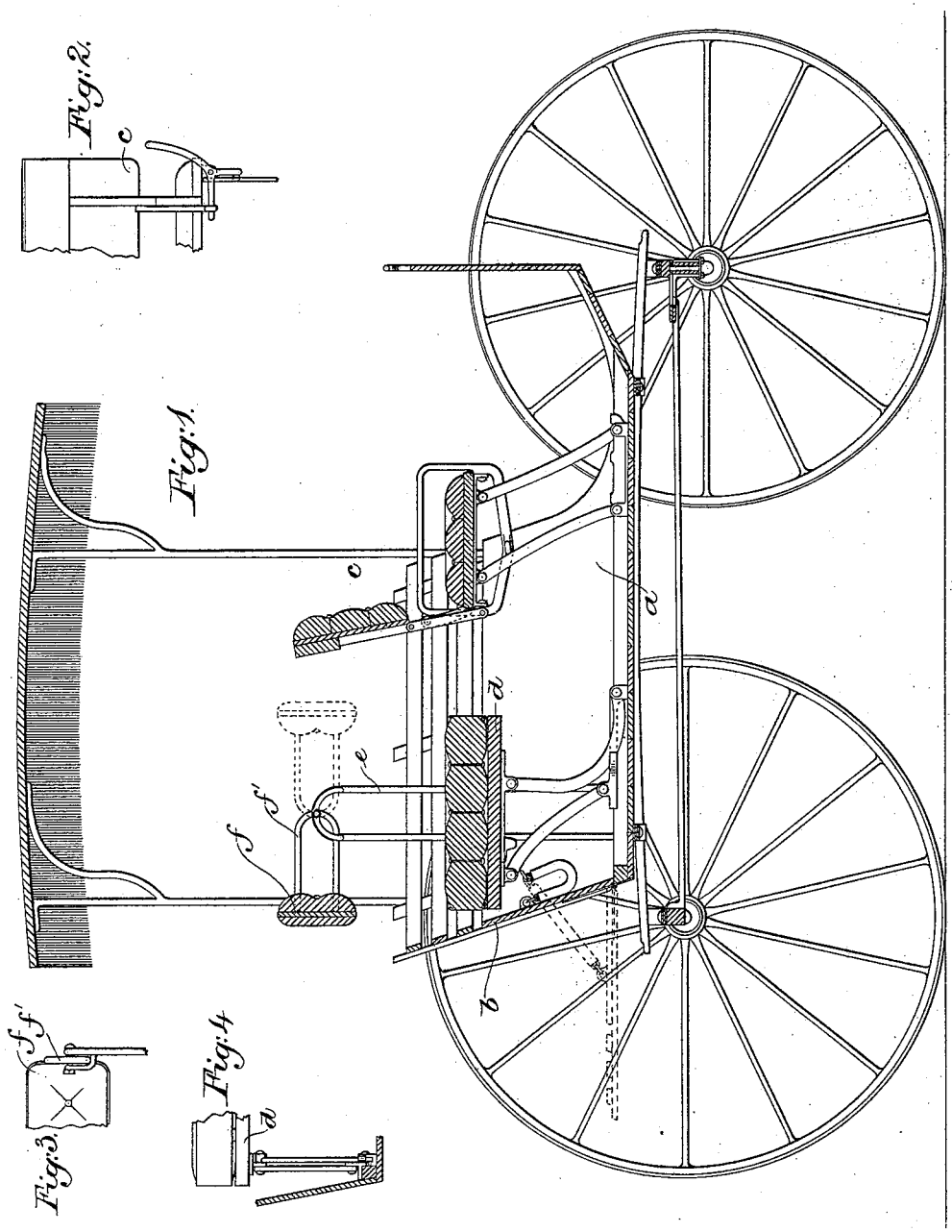

MOSES M. DENNETT, OF AMESBURY, MASSACHUSETTS.

SHIFTING-SEAT VEHICLE.

SPECIFICATION forming part of Letters Patent No. 438,610, dated October 21, 1890.

Application filed August 11, 1890. Serial No. 361,647. (No model.)

*To all whom it may concern:*

Be it known that I, MOSES M. DENNETT, of Amesbury, county of Essex, State of Massachusetts, have invented an Improvement in Wagons, of which the following description, in connection with the accompanying drawings, is a specification, like letters on the drawings representing like parts.

Wagons have heretofore been made having two seats arranged one in advance of the other, the rear seat being made as a jump-seat to be moved forward, and the front seat being made collapsible to be folded in the bottom of the wagon. Wagons have also been made containing two seats arranged back to back.

This invention has for its object to construct a wagon containing two seats, whereby when the parts are in a certain position all the riders may sit facing forward and when in another position but one seat is utilized, the riders facing forward, and when in another position the two seats are utilized, but arranged back to back.

In carrying out this invention the front seat is made in any well-known form to be folded in the bottom of the wagon, and the rear seat is made as a jump-seat to be utilized as a rear seat or as a front seat when moved forward. Two vertical side supports are secured to the wagon-body—one at each end of the rear seat—and to the top of these supports a back is pivoted, so that it can be utilized as a back for the rear seat when the riders face forward or when the riders face backward. The rear end of the wagon is pivoted to the body to serve as a drop tail-board, which may be let down to a level with the bottom or floor of the wagon-body, when the rear seat is utilized by the riders facing backward.

Figure 1 shows in vertical section a wagon embodying this invention; Figs. 2, 3, and 4, details to be referred to.

The wagon-body *a*, of any usual or suitable construction, has a pivoted end piece or tail-board *b*, which may be dropped into substantially horizontal position, as shown by dotted lines, Fig. 1. Two seats are provided, the front seat *c* being a collapsible one of any ordinary pattern, which may be folded in the bottom of the wagon. The rear seat *d* is a jump-seat of any ordinary pattern adapted to occupy a rear position, as shown in Fig. 1, or a position to about midway the wagon-body. At each end of the jump-seat *d* a vertical support, as *e*, is secured to the wagon-body, it being herein shown as a bent iron frame, and to the top of these vertical supports a back *f* is pivoted. This back *f* has at each end an arm, as *f'*, of suitable length to support the back *f* a short distance at one or the other side of the pivotal point.

With the parts as shown in full lines, Fig. 1, two seats are in position to be utilized by the riders, all facing forward. By turning the back *f* over on its pivot into the dotted-line position shown, and dropping the tail-board *b* into the dotted-line position shown, two seats are provided arranged back to back.

By folding the seat *c* in the bottom of the wagon and moving the jump-seat *d* into its forward position and turning the back *f* into the dotted-line position shown in Fig. 1, a single seat is provided midway in the body of the wagon and having the back *f* in proper position for use in connection therewith. Thus it will be seen that the back *f* serves as a back for the jump-seat *d* when in either of its positions.

I do not desire to limit my invention to the particular construction of the various parts.

I claim—

The wagon-body having a drop tail-board and two seats, the front one being collapsible and the rear one a jump-seat combined with a support at each end of the rear seat, and a pivoted back, as *f*, substantially as described.

In testimony whereof I have signed my name to this specification in the presence of two subscribing witnesses.

MOSES M. DENNETT.

Witnesses:
J. L. KNIGHT,
G. M. BAKER.